United States Patent [19]
Fischer

[11] 3,922,831
[45] Dec. 2, 1975

[54] EXPANSION ANCHOR FOR MOUNTING OBJECTS AT AN ADJUSTABLE DISTANCE FROM A SUPPORT STRUCTURE

[76] Inventor: Artur Fischer, Altheimer Str. 219 D-7241, Tumlingen, Germany

[22] Filed: Mar. 22, 1974

[21] Appl. No.: 453,835

[30] Foreign Application Priority Data
Apr. 16, 1973 Germany............................ 2319226
May 2, 1973 Germany............................ 2321967

[52] U.S. Cl........................................ 52/704; 85/64
[51] Int. Cl.²............................................ E04B 1/38
[58] Field of Search ..................... 52/704; 85/64, 87

[56] References Cited
UNITED STATES PATENTS

| | | | |
|---|---|---|---|
| 696,422 | 4/1902 | Duffy.................................. | 52/704 |
| 768,283 | 8/1904 | Jenkins................................ | 85/64 |
| 1,201,496 | 10/1916 | Peirce................................. | 85/64 |
| 1,645,903 | 10/1927 | Garber................................ | 52/708 |
| 3,087,206 | 4/1963 | Delf et al............................. | 52/704 |
| 3,381,567 | 5/1968 | Askey................................. | 85/87 |
| 3,851,559 | 12/1974 | Baude................................ | 85/64 |

FOREIGN PATENTS OR APPLICATIONS

| | | | |
|---|---|---|---|
| 1,340,012 | 9/1963 | France................................ | 52/704 |
| 279,457 | 11/1964 | Netherlands....................... | 52/704 |
| 1,109,570 | 4/1968 | United Kingdom................ | 85/87 |

*Primary Examiner*—James L. Ridgill, Jr.
*Attorney, Agent, or Firm*—Michael S. Striker

[57] ABSTRACT

An expansion anchor sleeve is adapted for insertion into an expansion anchor hole and has a leading end and a trailing end. An expander member is located at the leading end and can be drawn into the sleeve for expanding the same. An externally threaded bolt has a front portion which extends through the sleeve and engages the expander member to draw the same into the latter, and a rear portion which projects outwardly beyond the trailing end of the sleeve and the expansion anchor hole. A tapped sleeve is threaded onto the rear portion and on its end facing away from the expansion anchor sleeve the tapped sleeve is formed with a head; it also has external threads. An abutment member is threaded into the tapped sleeve and clamps between itself and the head an object through which the tapped sleeve extends.

1 Claim, 2 Drawing Figures

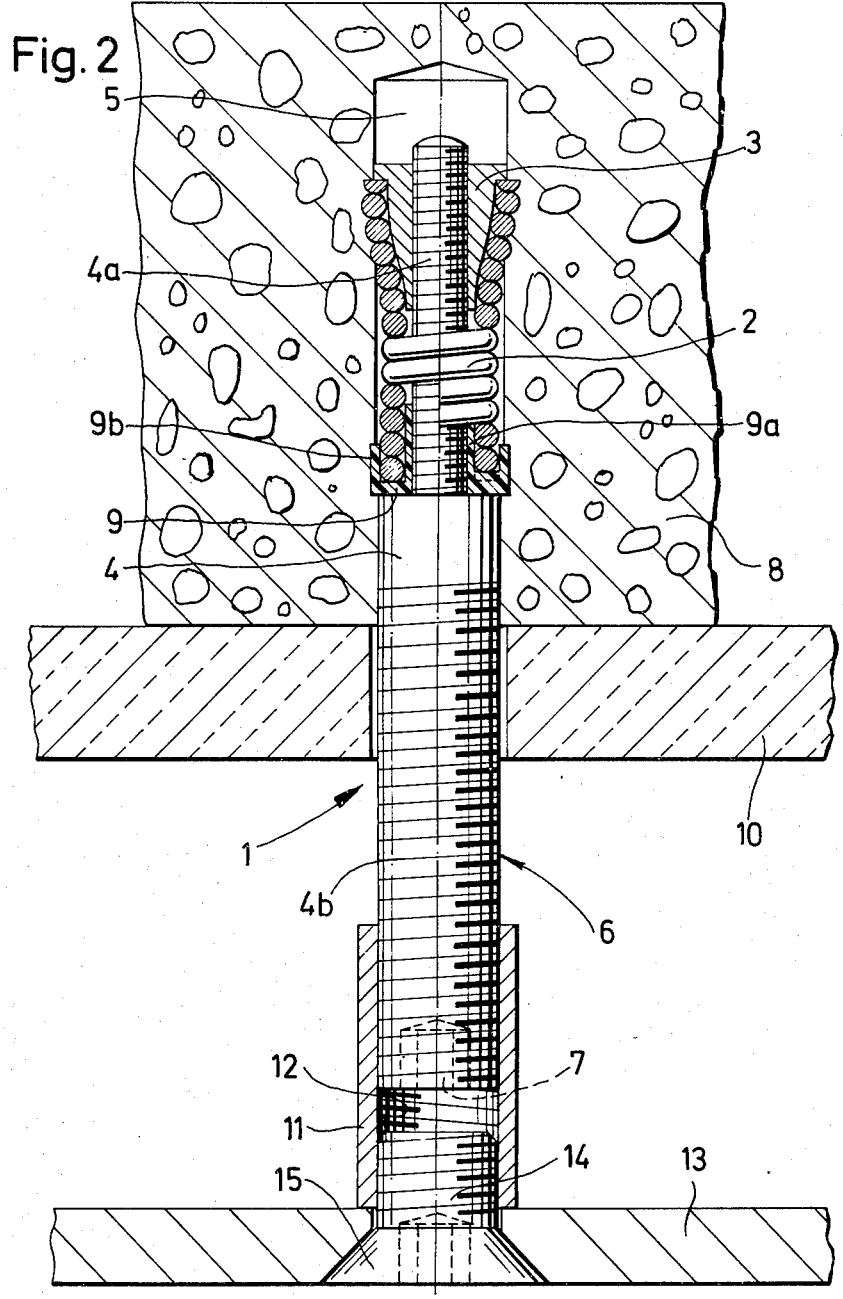

EXPANSION ANCHOR FOR MOUNTING OBJECTS AT AN ADJUSTABLE DISTANCE FROM A SUPPORT STRUCTURE

BACKGROUND OF THE INVENTION

The present invention relates generally to an expansion anchor, and more particularly to an expansion anchor for mounting objects at an adjustable distance from a support structure.

It is already known to provide expansion anchors of this type. One of these consists of a plastic sleeve having an elongated neck provided with a stop which holds an object at an adjustable distance from a support structure in which the sleeve is mounted. The stop is in form of a nut that can be screwed onto the external thread provided on the neck. The screw which is threaded into the sleeve to expand the same has a head between which and the nut the object to be affixed is held. Before the sleeve is expanded by turning of the screw, the sleeve is inserted to a greater or lesser degree into the expansion anchor hole. If it is subsequently desired to change the distance at which the affixed object is to be spaced from the wall or other support structure, the anchoring sleeve must be released. This is not only disadvantageous, but in certain circumstances such devices cannot be used at all. One of these circumstances involves the fact that the plastic expansion anchor has a relatively low bending resistance, which means that the expansion screw must carry the entire load of the element that is being supported. Thus, if the element is heavy, for instance a heavy structural member, such prior-art devices cannot be used at all, or else a very large number of such devices must be used per member to be held in place.

Metal expansion anchors of this type have similar disadvantages. Here, the shaft of the expansion screw projects from the expansion anchor hole. The shaft has a diameter which is smaller than the external diameter of the expansion anchor sleeve and on it the member to be supported is secured. The thinner the shaft of the expansion screw, the more disadvantageous the relationship of its bending and shearing resistance to the load of the member that it can carry.

SUMMARY OF THE INVENTION

It is, accordingly, an object of the present invention to overcome the disadvantages of the prior art.

More particularly, it is an object of the present invention to provide an improved expansion anchor of the type outlined here before, which will have high resistance to bending under stress.

An additional object of the invention is to provide such an expansion anchor which can be readily installed and wherein the distance of a supported object to the support structure in which the expansion anchor is secured, can be made in a simple manner even after the anchor is in place.

In keeping with the above objects, and with others which will become apparent hereafter, one feature of the invention resides in an expansion anchor for mounting objects at an adjustable distance from a support structure. The expansion anchor comprises and expansion anchor sleeve adapted for insertion into an expansion anchor hole and having a leading end and a trailing end. An expander member is provided at the leading end and attempted to be drawn into the sleeve for expanding the same. An externally threaded rodshaped member has a front portion extending through the sleeve from the trailing end to the leading end thereof and adapted to draw the expander member 8 to the leading end when turned in requisite direction. The rodshaped member also has a rear portion which projects outwardly beyond the trailing end and the expansion anchor hole. A tapped sleeve is threaded onto the rear portion and has an end which faces away from the expansion anchor sleeve which is formed with a head. The tapped sleeve also has external threads, and an abutment member is threaded onto the tapped sleeve and is adapted to clamp between itself and the head an object through which the tapped sleeve extends so that the abutment member and head are located at opposite sides of the object.

It is now only necessary to form a hole in the object which is to be mounted, corresponding to the outer diameter of the expansion anchor sleeve in unexpanded condition. The expansion anchor sleeve is then inserted through the hole into the bore of the support structure, and is expanded. Before this expansion is effected, the abutment is threaded onto the tapped sleeve at the concealed or reverse side of the element to be supported, and now the rod-shaped member, that is the screw or bolt, is turned until it expands the expansion anchor. In so doing, the element to be supported is fully mounted. This method of expansion differs substantially from the normal stay-bolt type of attachment in which a nut which is threaded onto the external thread of the bolt, draws in the stay-bolt and thus the expansion member in the direction of the bore opening and into the expansible expansion sleeve. The present invention does not require either an additional nut or a firm surface as a support for its anchorage, so that it can be anchored even if insulating slabs or the like are arranged on a wall, that is if the supported element is an insulating slab or the like.

Since the external diameter of the shaft of the screw advantageously corresponds to the external diameter of the expansion sleeve, excellent support is provided in the expansion anchor hole. In addition, the enlarged-diameter portion of the shaft which extends outside the bore hole assumes the task of supporting the weight of the element to be attached to the support structure, and thus to withstand the bending and shearing stresses resulting therefrom. The device according to the present invention is able to absorb relatively large bending and shearing stresses and thus can be used even for heavy objects which are to be attached, or if the objects are spaced at a considerable distance from the support structure in which the anchor is mounted. Moreover, a smaller number of the devices according to the present invention per element supported can be used than was previously required. The installation is more quickly accomplished than in the prior art, thus reducing valuable labor time.

The distance of the tapped sleeve from the surface of the support in which the expansion anchor hole is formed, and thus also the distance of the supported element from that surface, can be varied by threading the tapped sleeve along the shaft of the screw, within a range that depends on the length of the portion of the screw that projects outwardly from the expansion anchor hole. The element being supported is clamped between the sleeve or the nut thereon, and the head formed on the sleeve.

The expansion anchor sleeve itself is advantageously wound from wire in form of a block spring, and the expander member may be provided with a collar having an external diameter corresponding to the diameter of the expansion anchor hole, so as to contact the leading convolution of the block spring when it is drawn into the latter. The use of a block spring as the expansion anchor sleeve has the advantage that because of its elasticity the spring can be precisely fitted against the walls surrounding the expansion anchor hole, and consequently it can already provide for gripping of this wall before the expander member is drawn into the sleeve. This gripping effect prevents the sleeve from being turned as it is being expanded. Moreover, the expansion of a block spring only produces radial expansion forces so that there is a much smaller likelihood that the material in which the expansion anchor hole is formed might break away, even if the loads acting upon the expansion anchor are very high and the expansion anchor hole is very short. The provision of the collar on the expander member prevents the latter from being simply drawn through the expansion sleeve, and since the collar eventually bears against the leading end of the sleeve the expansion action is further intensified when a force tending to extract the anchor from the expansion anchor hole, acts upon the anchor via the screw.

The outer end of the expansion anchor sleeve, adjacent the inlet of the expansion anchor hole, may have a cover cap placed upon it, the cap advantageously being of synthetic plastic material. The cup may have two tubular collars one of which extends inside the sleeve and the other of which extends outside the sleeve, and they may be connected by a transverse portion which overlies the outer axial end of the sleeve. This arrangement slightly enlarges the external diameter of the sleeve by the wall thickness of the outer collar of the cap, and increases the friction of the anchor in the expansion anchor hole. This, in turn, provides an additional safeguard against undesired turning of the expansion anchor sleeve during expansion thereof in the initial stage of anchoring. Because it is of synthetic plastic material, of which a requisite one will be selected, for instance nylon or the like, the cap will tightly engage the bore wall, and act as a seal, thus preventing the penetration of moisture into the expansion anchor hole. This increases the life of the expansion anchor and maintains the operability and detachability of the anchor even after a consider period of time and even in circumstances where a great deal of moisture is present.

The head of the screw serving to expand the expansion anchor sleeve may be provided with means for engagement by a tool, for instance in form of a slot in which the bit of a screwdriver can be engaged, or in some other way.

The outer surface of the tapped sleeve may be roughened and/or provided with engaging portions by means of which the turning of the tapped sleeve is facilitated, the engaging portion for instance being of the type that can be engaged with a tool, such as a wrench or the like. This simplifies the adjustment of the distance of the supported element from the structure in which the anchor is mounted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a view similar to FIG. 1 but illustrating a different embodiment of the invention.

DESCRIPTION OF THE PREFERRED EMBODIMENTS

Figure 1:
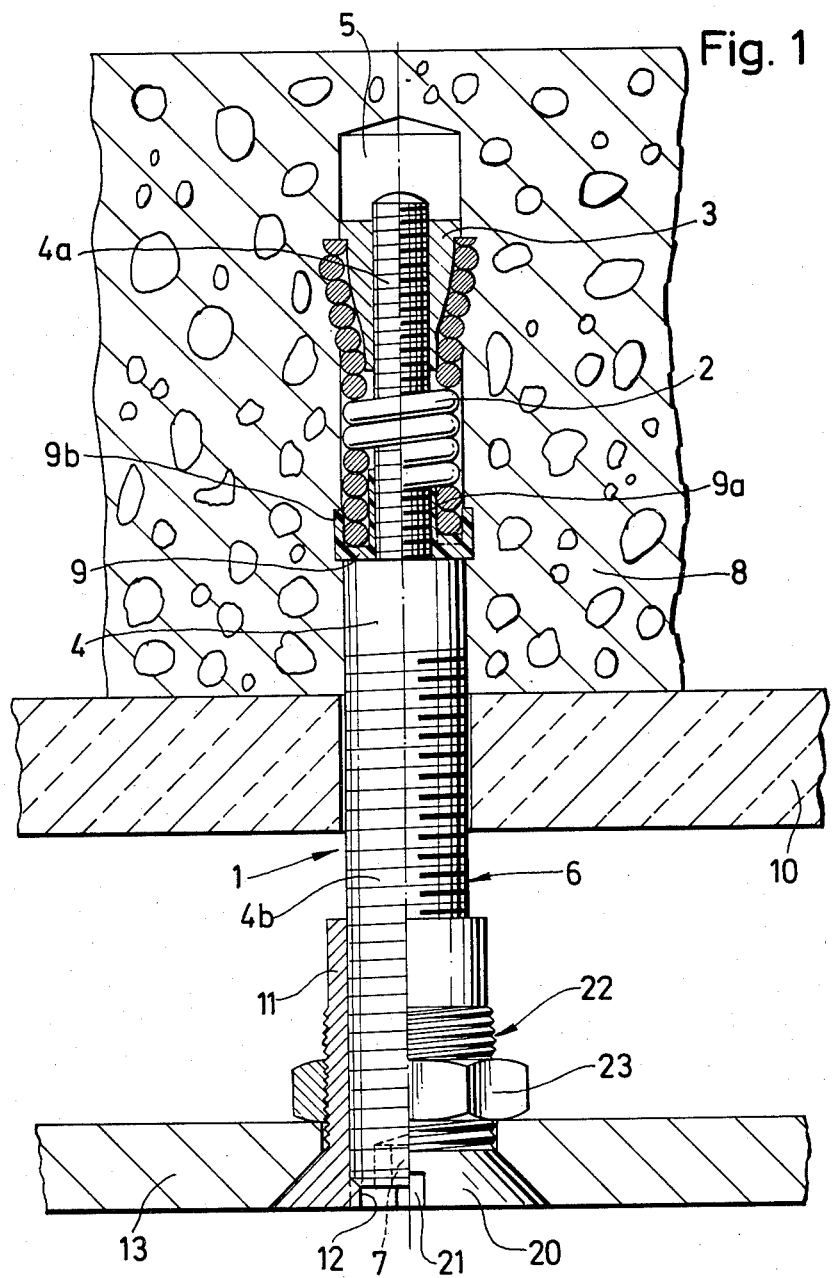
FIG. 1 is a sectional view illustrating one embodiment of the invention.

Referring firstly to FIG. 1 it will be seen that the expansion anchor 1 uses an expansion anchor sleeve 2 which in this embodiment is in form of a block spring wound of wire. An expansion screw 4 is provided which extends through the sleeve 2 and engages the expander member 3 that is located at the leading end of the sleeve 2, that is the end that is first inserted into the expansion anchor hole. The portion 4a of the screw 4 which engages the expander member 3 and extends through the sleeve 2 is of reduced diameter, whereas the outer diameter of the portion 4b which is located outside the sleeve 2 corresponds to the outer diameter of the sleeve 2 in unexpanded condition. The portion 4b extends entirely or over most of its length out of the expansion anchor hole 5 and is formed with an external thread 6. The end face of the portion 4b is provided with engaging portions, here in form of a hexagonal recess 7 adapted to be engaged by a tool to facilitate turning of the screw 4.

When the anchor 1 is to be secured in the expansion anchor hole 5 of the support structure 8, the screw 4 is turned, thereby turning the expander member 3 into the sleeve 2. The sleeve 2 engages the shoulder which exists at the juncture of the portions 4a and 4b of the screw 4, via a cap 9 which is of synthetic plactic material. This permits an expansion of the sleeve 2 even if a plate or panel of insulating material 10 is located outwardly adjacent the structure 8.

The cap 9 serves to prevent the sleeve from rotation and also to seal the expansion anchor hole 9 against the entry of moisture and other contaminants. It is formed with two tubular collars 9a and 9b, respectively, of which the former extends into the sleeve 2 whereas the other surrounds the exterior of the sleeve 2 in the region of the trailing end of the latter, and includes a transverse portion connecting the sleeves 9a and 9b which overlies the end face of the sleeve 2. The slight outer diameter increase obtained by the presence of the collar 9b provides for sufficient friction in the expansion anchor hole 5 to further increase the protection against undersired turning of the expansion anchor sleeve as the latter is being expanded.

A tapped sleeve 11 is threaded onto the external threads 6 of the portions 4b of the screw 4, for which purpose the sleeve 11 is provided with internal threads 12. That end of the sleeve 11 which is remote from the structure 8 is formed as a screwhead 20 having a slot 21 in which a tool, such as the bit of a screwdriver, can be inserted to facilitate turning of the sleeve 11. Over a portion of its axial length the sleeve 11 is also provided with an external thread 22 on which an abutment member 23 can be threaded, for instance a nut. By tightening the nut 23 against one side and the head 20 against the opposite side of an object 13, for instance a cladding panel or the like, the object 13 is clamped between the head 20 and the nut 23 and is firmly held in place.

The desired spacing of the element 13 from the surface of the structure 8 can be readily adjusted by turning the sleeve 11 until it has reached the requisite spacing from the surface of the structure 8.

The embodiment of FIG. 2 is reminiscent of FIG. 1, but here it is the axial end of the sleeve 11 which serves as an abutment for the element 13. To hold the latter in place, a further screw 14 is provided which can be threaded into that portion of the interior thread 12 of the sleeve 11 which extends outwardly beyond the rear end of the portion 4b of the screw 4. The element 13 will then be clamped between the head 15 of this additional screw 14 and the rear axial end of the sleeve 11. Again, the spacing of the element 11 from the surface of the structure 8 is adjusted by turning the sleeve 11 in requisite direction.

It will be understood that each of the elements described above, or two or more together, may also find a useful application in other typed of constructions differing from the types described above.

While the invention has been illustrated and described as embodied in an expansion anchor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An expansion anchor for mounting objects at an adjustable distance from a support structure comprising an expansion anchor sleeve adapted for insertion into an expansion anchor hole and having a leading end and a trailing end; an expansion member at said leading end and adapted to be drawn into said sleeve for expanding the same; an externally threaded rod-shapped member having a front portion extending through said sleeve from said trailing to leading end thereof and adapted to draw said expanded member into said leading end when turned in requisite direction, and a rear portion projecting outwardly beyond said trailing end and said expansion anchor hole; a tapped sleeve threaded onto said rear portion and having an end which faces away from said expansion anchor sleeve and is formed with a head; and an abutment on said tapped sleeve and adapted to clamp between itself and said head an object through which said rear portion extends so that said abutment and head are located at opposite sides of the object and further comprising a tubular cap of synthetic plastic material at said trailing end of said sleeve and including an inner tubular collar extending into said sleeve, an outer tubular collar exteriorly surrounding said sleeve, and an annular portion connecting said collars and overlaying an axial end face of said trailing end.

* * * * *